(12) United States Patent
Porter (10) Patent No.: US 7,300,892 B2
(45) Date of Patent: Nov. 27, 2007

(54) FACING MATERIAL WITH CONTROLLED POROSITY FOR CONSTRUCTION BOARDS

(75) Inventor: John Frederick Porter, St. Catharines (CA)

(73) Assignee: Saint-Gobain Technical Fabrics Canada, Ltd., Northborough, MA (US)

( * ) Notice: Subject to any disclaimer, the term of this patent is extended or adjusted under 35 U.S.C. 154(b) by 31 days.

(21) Appl. No.: 11/280,836

(22) Filed: Nov. 16, 2005

(65) Prior Publication Data

US 2006/0105653 A1    May 18, 2006

Related U.S. Application Data

(62) Division of application No. 10/348,489, filed on Jan. 21, 2003, now Pat. No. 7,049,251.

(51) Int. Cl.
| | |
|---|---|
| *B32B 27/04* | (2006.01) |
| *B32B 27/12* | (2006.01) |
| *B32B 5/02* | (2006.01) |
| *B32B 15/14* | (2006.01) |

(52) U.S. Cl. .................. 442/79; 442/118; 442/238; 428/911; 428/913

(58) Field of Classification Search .................. 442/79, 442/256, 266, 189, 86, 85, 210, 225, 118, 442/279, 238, 286, 355; 428/219, 294.7, 428/911, 913
See application file for complete search history.

(56) References Cited

U.S. PATENT DOCUMENTS

| 1,439,954 A | 12/1922 | Emerson |
| 1,787,163 A | 12/1930 | New |
| 1,805,840 A | 5/1931 | New |

(Continued)

FOREIGN PATENT DOCUMENTS

| CA | 993779 | 7/1927 |

(Continued)

OTHER PUBLICATIONS

Office Action dated May 17, 2004 in U.S. Appl. No. 10/696,751 (D1815-00138).

(Continued)

*Primary Examiner*—Lynda Salvatore
(74) *Attorney, Agent, or Firm*—Duane Morris LLP (57) ABSTRACT

This invention provides facing materials for cementitious boards such as those including Portland cement or gypsum cores. The preferred facing material includes, in a first embodiment, a facing layer having an areal weight of about 300 grams/$M^2$, and an air permeability rating of no greater than about 300 CFM/$ft^2$ (FG 436-910 test method). The facing layer reduces the penetration of a slurry of cementitious material during the manufacture of a cementitious board, while permitting the water vapor from the slurry to pass therethrough. The facing materials of this invention can be designed to substantially eliminate the fouling of rolls used in continuous processing of such boards without the use, or with greatly reduced use, of costly viscosity control agents in the slurry. In addition, further embodiments of this invention can include binders, coatings or saturants which are designed to decrease pore size, increase or decrease the contact angle of liquids, or promote greater adhesion to cementitious cores, greater adhesion to other layers in the facing material, or greater adhesion or affinity to various types of adhesive compositions used to join cementitious boards to insulation and exterior finishing systems (EIS or EIFS).

18 Claims, 3 Drawing Sheets

U.S. PATENT DOCUMENTS

| | | |
|---|---|---|
| 1,808,003 A | 6/1931 | New |
| 1,975,787 A | 10/1934 | Hansen |
| 2,206,042 A | 7/1940 | Novak |
| 2,208,232 A | 7/1940 | Smolak |
| 2,238,017 A | 4/1941 | Duncan |
| 2,432,963 A | 12/1947 | Camp |
| 2,464,759 A | 3/1949 | Camp |
| 2,483,806 A | 10/1949 | Buckley |
| 2,514,484 A * | 7/1950 | Frederick, Jr. .............. 428/212 |
| 2,526,066 A | 10/1950 | Croce |
| 2,560,521 A | 7/1951 | Camp |
| 2,597,901 A | 5/1952 | Riddell et al. |
| 2,610,130 A | 9/1952 | Riddell et al. |
| 2,633,441 A | 3/1953 | Buttress |
| 2,681,863 A | 6/1954 | Croce et al. |
| 2,744,022 A | 5/1956 | Croce et al. |
| 2,902,395 A | 9/1959 | Hirschy et al. |
| 2,954,302 A | 9/1960 | Gorman, Jr. |
| 3,185,297 A | 5/1965 | Rutledge |
| 3,214,289 A | 10/1965 | Lefebvre |
| 3,284,980 A | 11/1966 | Dinkel |
| 3,289,371 A | 12/1966 | Pearson et al. |
| 3,333,974 A | 8/1967 | Sherr |
| 3,391,037 A | 7/1968 | McNulty |
| 3,454,456 A | 7/1969 | Willey |
| 3,455,710 A | 7/1969 | Nitzsche et al. |
| 3,516,882 A | 6/1970 | Cummisford |
| 3,607,486 A | 9/1971 | Jacks et al. |
| 3,616,173 A | 10/1971 | Green et al. |
| 3,623,895 A | 11/1971 | Nitzsche et al. |
| 3,666,581 A | 5/1972 | Lane |
| 3,766,003 A | 10/1973 | Schuller et al. |
| 3,788,271 A | 1/1974 | Carpenter et al. |
| 3,830,687 A | 8/1974 | Re et al. |
| 3,918,230 A | 11/1975 | Carroll |
| 3,929,947 A | 12/1975 | Schwartz et al. |
| 3,935,021 A | 1/1976 | Greve et al. |
| 3,941,632 A | 3/1976 | Swedenberg et al. |
| 3,944,698 A | 3/1976 | Dierks et al. |
| 3,947,398 A | 3/1976 | Williams |
| 3,964,944 A | 6/1976 | Gwynne |
| 3,971,184 A | 7/1976 | Van Wagoner |
| 3,993,822 A | 11/1976 | Knauf et al. |
| 4,020,237 A | 4/1977 | von Hazmburg |
| 4,047,355 A | 9/1977 | Knorr |
| 4,048,364 A | 9/1977 | Harding et al. |
| 4,064,306 A | 12/1977 | Scotchmer et al. |
| 4,065,333 A | 12/1977 | Lawlis et al. |
| 4,065,597 A | 12/1977 | Gillespie |
| 4,067,939 A | 1/1978 | Lowe et al. |
| 4,073,997 A | 2/1978 | Richards et al. |
| 4,087,577 A | 5/1978 | Hendrickson |
| 4,094,694 A | 6/1978 | Long |
| 4,112,174 A | 9/1978 | Hannes et al. |
| 4,117,686 A | 10/1978 | Hilfiker |
| 4,127,628 A | 11/1978 | Uchida et al. |
| 4,128,699 A | 12/1978 | Kole et al. |
| 4,135,029 A | 1/1979 | Pfeffer |
| 4,148,781 A | 4/1979 | Narukawa et al. |
| 4,152,878 A | 5/1979 | Balinski |
| 4,181,767 A | 1/1980 | Steinau |
| 4,187,130 A | 2/1980 | Kautz |
| 4,195,110 A | 3/1980 | Dierks et al. |
| 4,203,788 A | 5/1980 | Clear |
| 4,229,497 A | 10/1980 | Piazza |
| 4,238,445 A | 12/1980 | Stone |
| 4,242,406 A | 12/1980 | El Bouhnini et al. |
| 4,242,779 A | 1/1981 | Curinier et al. |
| 4,252,568 A | 2/1981 | Bounini |
| 4,265,979 A | 5/1981 | Baehr et al. |
| 4,273,476 A | 6/1981 | Kotulla et al. |
| 4,275,105 A | 6/1981 | Boyd et al. |
| 4,296,169 A | 10/1981 | Shannon |
| 4,302,495 A | 11/1981 | Marra |
| 4,303,722 A | 12/1981 | Pilgrim |
| 4,324,082 A | 4/1982 | Rutkowski et al. |
| 4,335,177 A | 6/1982 | Takeuchi |
| 4,340,558 A | 7/1982 | Hendrickson |
| 4,341,560 A | 7/1982 | Saito et al. |
| 4,344,804 A | 8/1982 | Bijen et al. |
| 4,344,910 A | 8/1982 | Bijen |
| 4,345,037 A | 8/1982 | Fyles et al. |
| 4,351,867 A | 9/1982 | Mulvey et al. |
| 4,361,613 A | 11/1982 | Bogner et al. |
| 4,361,616 A | 11/1982 | Bomers |
| 4,364,212 A | 12/1982 | Pearson et al. |
| 4,378,405 A | 3/1983 | Pilgrim |
| 4,403,006 A | 9/1983 | Bruce et al. |
| 4,411,701 A | 10/1983 | Saito et al. |
| 4,421,704 A | 12/1983 | Reily |
| 4,449,336 A | 5/1984 | Kelly |
| 4,472,086 A | 9/1984 | Leach |
| 4,477,300 A | 10/1984 | Pilgrim |
| 4,491,617 A | 1/1985 | O'Connor et al. |
| 4,494,990 A | 1/1985 | Harris |
| 4,504,335 A | 3/1985 | Galer |
| 4,504,533 A | 3/1985 | Altenhofer et al. |
| 4,506,060 A | 3/1985 | White, Sr. et al. |
| 4,518,652 A | 5/1985 | Willoughby |
| 4,537,610 A | 8/1985 | Armstrong et al. |
| 4,564,544 A | 1/1986 | Burkard et al. |
| 4,571,356 A | 2/1986 | White, Sr. et al. |
| 4,578,301 A | 3/1986 | Currie et al. |
| 4,610,915 A | 9/1986 | Crenshaw et al. |
| 4,616,959 A | 10/1986 | Hilfiker |
| 4,617,219 A | 10/1986 | Schupack |
| 4,640,864 A | 2/1987 | Porter |
| 4,643,119 A | 2/1987 | Langston et al. |
| 4,643,771 A | 2/1987 | Steinbach et al. |
| 4,647,496 A | 3/1987 | Lehnert et al. |
| 4,664,707 A | 5/1987 | Wilson et al. |
| 4,681,802 A | 7/1987 | Gaa et al. |
| 4,699,542 A | 10/1987 | Shoesmith |
| 4,722,866 A | 2/1988 | Wilson et al. |
| 4,736,561 A | 4/1988 | Lehr et al. |
| 4,753,840 A | 6/1988 | Van Gompel |
| 4,762,750 A | 8/1988 | Girgis et al. |
| 4,778,700 A | 10/1988 | Pereira |
| 4,783,942 A | 11/1988 | Nunley et al. |
| 4,793,892 A | 12/1988 | Miller et al. |
| 4,810,569 A | 3/1989 | Lehnert et al. |
| 4,810,576 A | 3/1989 | Gaa et al. |
| 4,811,538 A | 3/1989 | Lehnert et al. |
| 4,816,091 A | 3/1989 | Miller |
| 4,856,939 A | 8/1989 | Hilfiker |
| 4,879,173 A | 11/1989 | Randall |
| 4,910,064 A | 3/1990 | Sabee |
| 4,948,647 A | 8/1990 | Burkard |
| 4,957,390 A | 9/1990 | Shoesmith et al. |
| 4,967,548 A | 11/1990 | Fangeat et al. |
| 4,992,003 A | 2/1991 | Perach |
| 5,011,523 A | 4/1991 | Roncato et al. |
| 5,079,078 A | 1/1992 | Jutte, Jr. et al. |
| 5,091,247 A | 2/1992 | Willibey et al. |
| 5,108,224 A | 4/1992 | Cabniss et al. |
| 5,110,627 A | 5/1992 | Shoesmsith et al. |
| 5,112,678 A | 5/1992 | Gay et al. |
| 5,135,805 A | 8/1992 | Sellers et al. |
| 5,139,841 A | 8/1992 | Makoui et al. |
| 5,148,645 A | 9/1992 | Lehnert et al. |
| 5,161,917 A | 11/1992 | Papetti |
| 5,163,261 A | 11/1992 | O'Neill |
| 5,200,246 A | 4/1993 | Sabee |
| 5,220,762 A | 6/1993 | Lehnert et al. |

| | | |
|---|---|---|
| 5,221,386 A | 6/1993 | Ensiminger et al. |
| 5,246,306 A | 9/1993 | Shoesmith et al. |
| 5,267,816 A | 12/1993 | Mercer et al. |
| 5,308,692 A | 5/1994 | Kennedy et al. |
| 5,316,561 A | 5/1994 | Roncato et al. |
| 5,319,900 A | 6/1994 | Lehnert et al. |
| 5,328,493 A | 7/1994 | Roncato et al. |
| 5,342,566 A | 8/1994 | Schafer et al. |
| 5,342,680 A | 8/1994 | Randall |
| 5,350,554 A | 9/1994 | Miller |
| 5,370,756 A | 12/1994 | Buis et al. |
| 5,371,989 A | 12/1994 | Lehnert et al. |
| 5,393,559 A | 2/1995 | Shoesmith et al. |
| 5,395,685 A | 3/1995 | Seth et al. |
| 5,397,631 A | 3/1995 | Green et al. |
| 5,401,588 A | 3/1995 | Garvey et al. |
| 5,419,092 A | 5/1995 | Jaecklin |
| 5,425,796 A | 6/1995 | Loubinoux et al. |
| 5,439,518 A | 8/1995 | Francis et al. |
| 5,451,355 A | 9/1995 | Boissonnat et al. |
| 5,454,846 A | 10/1995 | Roncato et al. |
| 5,552,187 A | 9/1996 | Green et al. |
| 5,552,207 A | 9/1996 | Porter et al. |
| 5,601,888 A | 2/1997 | Fowler |
| 5,637,362 A | 6/1997 | Chase et al. |
| 5,644,880 A | 7/1997 | Lehnert et al. |
| 5,704,179 A | 1/1998 | Lehnert et al. |
| 5,709,053 A | 1/1998 | Kuroda |
| 5,718,785 A | 2/1998 | Randall |
| 5,763,043 A | 6/1998 | Porter et al. |
| 5,772,846 A | 6/1998 | Jaffee |
| 5,791,109 A | 8/1998 | Lehnert et al. |
| 5,945,182 A | 8/1999 | Fowler et al. |
| 5,981,406 A | 11/1999 | Randall |
| 6,001,496 A | 12/1999 | O'Haver-Smith |
| 6,054,205 A * | 4/2000 | Newman et al. ............ 428/221 |
| 6,171,984 B1 | 1/2001 | Paulson et al. |
| 6,183,835 B1 | 2/2001 | Cho et al. |
| 6,254,817 B1 | 7/2001 | Cooper et al. |
| 6,335,087 B1 | 1/2002 | Hourahane |
| 6,391,131 B1 | 5/2002 | Newman et al. |
| 6,481,171 B2 | 11/2002 | Yu et al. |
| 6,579,413 B1 | 6/2003 | Grove |
| 6,770,354 B2 | 8/2004 | Randall et al. |
| 6,808,793 B2 | 10/2004 | Randall et al. |
| 6,838,163 B2 | 1/2005 | Smith et al. |
| 2002/0151240 A1* | 10/2002 | Smith et al. ................ 442/327 |
| 2002/0170648 A1 | 11/2002 | Dinkel |
| 2002/0182953 A1 | 12/2002 | Porter |
| 2002/0182954 A1 | 12/2002 | Porter |
| 2003/0051430 A1 | 3/2003 | Grove |
| 2003/0175478 A1 | 9/2003 | Leclercq |
| 2004/0084127 A1 | 5/2004 | Porter |
| 2004/0150139 A1 | 8/2004 | Gregg et al. |
| 2004/0209060 A1 | 10/2004 | McGrady et al. |
| 2004/0224584 A1 | 11/2004 | Broadway |

FOREIGN PATENT DOCUMENTS

| | | |
|---|---|---|
| CA | 721719 | 11/1965 |
| CA | 794590 | 9/1968 |
| CA | 1029645 | 4/1978 |
| CA | 1189434 | 6/1985 |
| DE | 1033123 | 6/1958 |
| DE | 1033133 | 6/1958 |
| DE | 1223287 | 6/1966 |
| DE | 1509853 | 4/1970 |
| DE | 2008744 | 9/1971 |
| DE | 2127142 | 12/1971 |
| DE | 2049 603 | 6/1972 |
| DE | 7806114 | 3/1978 |
| DE | 2755879 | 6/1979 |
| DE | 2808723 | 9/1979 |
| DE | 3508933 A1 | 3/1985 |
| DE | 3921779 | 1/1991 |
| EP | 0154094 | 2/1984 |
| EP | 0 148 760 | 7/1985 |
| EP | 0 148 761 | 7/1985 |
| EP | 0343404 | 11/1989 |
| EP | 0637658 | 8/1995 |
| GB | 772581 | 4/1957 |
| GB | 1058957 | 2/1967 |
| GB | 1520411 | 8/1978 |
| GB | 2013 563 A | 12/1978 |
| GB | 2004807 | 4/1979 |
| GB | 1204541 | 9/1979 |
| GB | 2 022 503 A | 12/1979 |
| GB | 2023687 | 1/1980 |
| GB | 1588899 | 4/1981 |
| GB | 2 053 779 B | 5/1983 |

OTHER PUBLICATIONS

Plastics Engineering Handbook, 4$^{th}$ ed., Joel Frados, Ed., p. 29, 1987.
Fehrer AG, The Dref 2 Friction Spinning Machine, technical brochure, pp. 1-27, 1993, Linz, Austria.
Search Report from International Application PCT/US99/28931, dated Mar. 17, 2000.
Office Action dated Jan. 30, 2001 in U.S. Appl. No. 09/206,636.
Office Action dated Sep. 25, 2000 in U.S. Appl. No. 09/206,636.
Office Action dated Jun. 21, 2000 in U.S. Appl. No. 09/206,636.
Notice of Allowance dated Dec. 23, 2004 in U.S. Appl. No. 09/844,058.
Office Action dated Mar. 15, 2004 in U.S. Appl. No. 09/844,058.
Office Action dated Jul. 32, 2003 in U.S. Appl. No. 09/844,058.
Office Action dated May 9, 2003 in U.S. Appl. No. 09/844,058.
Office Action dated Feb. 25, 2003 in U.S. Appl. No. 09/844,058.
Office Action dated Aug. 30, 2002 in U.S. Appl. No. 09/844,058.
Sto, Exterior Insulation Systems and Finishes, Trade Literature, 4 pages, Sep. 1982.
What Color Is Your Wall? R-wall™ Exterior Insulation and Finish System, Trade Literature, pp. 1-16, 1982.
Construction Dimensions, Ful-O-Mite™ IDS, H.B, Fuller Co., Trade Literature, 2 pages, Jul. 1983.
Owens Corning Fiberglas, Form Board, for "Poured-in-Place" Roof Decks, Trade Literature, pp. 1-8, Sep. 19**.
Amico, Metal Lath, Trade Literature, 1 page, no date.
Bestwall®, "Firestopper" poured-in-place Gypsum Roof Decks, Trade Literature, pp. 1-8, no date.
Neuhauser, Dr. Gerhard, Knauf Fireboard, pp. 2-11, Apr. 1984, with 1 page English translation.
Creed, Douglas, Construction Dimensions, "Mechanical Fastening: A Manufacturer's Response", pp. 31-34, Nov. 1985.
Paschal, Suzanne, Timber Products Inspection, Project No. 85-03, Report No. 4, pp. 1-10, Nov. 1985.
Singh, "The effect of porosity on the properties of glass fibre-reinforced gypsum plaster", Journal of Materials Science 10 (1975) 1920-1928.
Reinhart, Engineered Materials Handbook, vol. 1, Composites, 1987 ASM International.

* cited by examiner

FACING MATERIAL WITH CONTROLLED POROSITY FOR CONSTRUCTION BOARDS

CROSS REFERENCE TO RELATED APPLICATION

This application is a Division of U.S. patent application Ser. No. 10/348,489, filed Jan. 21, 2003, now U.S. Pat. No. 7,049,251, issued May 23, 2006.

FIELD OF THE INVENTION

This invention relates to improvements to cementitious boards useful in building construction, such as cement and gypsum sheathing for EIF systems, shaft walls, tile backers and fire walls.

BACKGROUND OF THE INVENTION

Cementitious boards useful in the construction industry are known to contain inorganic, hydraulically setting material, such as Portland cement or gypsum. Hydraulic gypsum and cement, once set, have very little tensile strength and are usually reinforced with facing materials which improve the resistance to tensile and torsional loads. This has been the basis for using paper facing on conventional gypsum wall board and glass fiber scrim in cement boards.

Recently, gypsum sheathing has been used outdoors in exterior insulation or finishing systems, with or without insulation layers, (sometimes referred to as "EIF systems"). These systems are designed to accept polystyrene insulation adhered to a glass-faced gypsum board, followed by brick, stone, a thin application of stucco, or siding, for example. Because of the exposure to the elements, these boards are often treated or impregnated with hydrophobic additives. Simply adding hydrophobic agents, such as asphalt, waxes, or siloxane to the core or paper facing, however, does not prevent delamination at the interface between the core and paper facing, nor does it prevent the paper from losing most of its strength due to water absorption over time. Cementitious boards used in exterior sheathing applications should also be fire resistant, which limits the use of flammable facing materials. It has become essential, therefore, that the core, the interface, and the facing material, on the exposed side of these boards, retain their strength after exposure to wind, rain, snow, fire and ultraviolet light.

To the extent that cementitious boards are used in the interior of buildings, for tile backing, shaft wall, and fire wall applications, moisture and fire resistance requirements also limit the use of paper facing. While paper can be treated with moisture vapor retarders and non-permeable barrier films, these layers impede water vapor from cementitious slurries from evaporating through the facing. This makes continuous board manufacturing with vapor impermeable films difficult, since the slurry must be allowed to evaporate the excess "water of convenience", which represents additional water used to facilitate a slurry, which is not used in hydration.

Accordingly, artisans over the last thirty years have developed facing materials made from glass fibers which are known to overcome many of the weaknesses of paper facing materials. For example, in Canadian Patent No. 993,779, gypsum boards are disclosed which are prepared by depositing a plaster slurry on a sheet of inorganic fibers on a moving conveyor belt. A second sheet of similar fibers is pressed on top of the slurry, followed by guiding the sandwiched plaster slurry between rollers to cause a slurry to penetrate into the fibrous sheets at the surfaces of the slurry mass. It has been found that such a process gives only partial and irregular penetration of the slurry into the inorganic, fibrous sheet, leaving the resulting board with a rough surface in which both fibers and gypsum are apparent. Due to the penetration of slurry, contamination of the rollers by set gypsum is an unfortunate consequence. Such contamination can leave imperfections in the surface of subsequently produced boards on the same line if not remedied. Unfortunately, remediating contaminated rollers requires shutting down the entire continuous wallboard manufacturing line for a period of hours or days, which leads to significant losses in production and downtime costs.

Others have addressed this problem of gypsum slurry penetration during continuous board production. In U.S. Pat. Nos. 3,993,822 and 4,504,533 (also incorporated herein by reference), a composite glass mat layer containing a fiberglass cloth joined with a fiberglass fleece, pasteboard, foil, felt or paper is used to make boards. In each method, the fleece, felt or alternative sheet is resistant to the penetration of gypsum and the structure is formed by simple successive application of the different sheets and compositions to a forming table or conveyor. The resulting product has a surface texture determined by the nature of the outer sheet used. However, due to the lack of any integral fastening measure between the glass fiber cloth and the outer sheet, the outer sheets selected can be insufficiently bonded to the set gypsum core. This can lead to unintended delaminations during adhesive bonding in the assembly of EIF systems. Polymeric webs combined with glass scrim reinforcement has also been suggested for facing sheets of cementitious boards. See U.S. Pat. No. 6,054,205, which is also hereby incorporated by reference.

More recently, attempts have been made to employ the use of random oriented, chopped glass fibrous mats bonded by a resinous adhesive. See U.S. Pat. Nos. 4,647,496, 4,810,569 and 5,220,762. The described production methods of these patents prefer to employ viscosity-control agents, such as paper fiber, cellulosic thickeners, bentonite clays, and starches for permitting the top glass fiber mat to be substantially free of set gypsum, while not preventing penetration through the lower mat. Since only one surface of the gypsum board needs to be free of set gypsum, for adhesive attachment of polystyrene insulation layers, and such, designing a slurry to penetrate the lower glass mat, while only partially penetrating the upper glass mat, produces a commercially acceptable product. However, the fouling of shaping and feeder rolls used to press and shape glass mat faced gypsum wallboard is not entirely solved by such a solution, since gypsum slurry penetration through the lower mat is not prevented.

While efforts have been made to reduce moisture penetration in glass mat faced gypsum boards by applying latex coatings to the set board (see U.S. Pat. No. 5,552,187, which is incorporated by reference) artisans have been reluctant to reduce the porosity of the glass mat prior to contacting the gypsum slurry. Two reasons for this could be the fear of insufficient penetration by the slurry into the pores of the mat, which would result in poor adhesion, or the concern that a less porous mat would prohibit or reduce water vapor from successfully escaping the core during setting.

Accordingly, there remains a need in the industry for manufacturing cementitious boards to create a high strength, fire-resistant facing material which does not delaminate in wet environments, yet is not substantially permeable to slurries of cementitious material which have been known to contaminate rolls used in the continuous processing of such boards.

SUMMARY OF THE INVENTION

In accordance with a first preferred embodiment of the present invention, a facing material is provided for use in the manufacture of cementitious boards for building construction. The facing material includes a porous facing layer containing glass fibers having an average diameter of about 16 microns or less, said facing layer having an areal weight of about 15-300 gram/m$^2$, and an air permeability rating of no greater than about 300 CFM/ft$^2$ (FG 436-910 test methods), said facing layer substantially preventing a slurry of said cementitious material disposed on top of said facing layer from substantially penetrating through its full thickness during the manufacture of said cementitious board. The porous spacing layer also permits the passage of water vapor from said slurry to pass therethrough.

The facing materials of this invention provide cementitious boards, such as those made from Portland cement and gypsum, to achieve high strength and greater fire resistance than paper-faced boards. The most preferred facing materials are not substantially permeable to cementitious slurries, which have been known to contaminate rolls, and are preferably joined to the board's core in such a way so as to substantially eliminate delamination between the facing and the core, or between the layers of the facing material, if more than one layer is applied. While substantially reducing the penetration of a cementitious slurry, the facing materials of this invention still permit the passage of water vapor from the slurry to pass through, before and during the setting of the cementitious material. The facing materials, and boards manufactured using them, are suitable for exterior grade sheathing containing a modified gypsum or cement core. They can contain exposed glass fibers on one or both sides for helping to join to adhesives, such as mortar, acrylic or silicone based adhesives, and glue, in exterior insulation finishing systems ("EIF") or tile-backing applications, for example. The cementitious boards produced by this invention can contain a porous facing layer containing glass fibers on one or both faces, and can contain water- and fire-resistant additives in the facings, core, or both.

The preferred water- and fire-resistant facing material of this invention has an areal weight of at least about 15 grams/m$^2$ and desirably, has an areal weight of between about 30 and 150 grams/m$^2$. This areal weight is high enough to provide the board with the required physical properties such as stiffness, flexural strength, nail or screw holding capability, and dimensional stability. It is light enough to be economically transported when applied to a board, and handled by EIF or shaft wall system installers, without premature fatigue.

The desirable properties of the facing layers and materials of this invention include being substantially impervious to the penetration of a slurry having a viscosity of about 300-10,000 cp at 70° F., having a screw holding value of at least about 20 lbs. when applied to a cementitious material, and an ASTM D309 tensile strength of at least about 20 psi in the machine direction, and at least about 5 psi in the cross-machine direction.

In a further embodiment of this invention, a method of making a water-resistant cementitious board useful in building construction is provided, which includes the steps of (a) forming a slurry of cementitious material and water in a quantity greater than that required to set said cementitious material; (b) disposing said slurry on top of a first facing layer; (c) disposing a second facing layer on top of said slurry, wherein at least said first facing layer comprises a porous material containing glass fibers having an average diameter of less than about 16 microns; said first facing layer having an air permeability rating of less than about 300 CFM/ft$^2$ (FG 436-910 test method), so as to substantially prevent penetration of said slurry, yet permits water vapor from said slurry to pass therethrough; and (d) permitting said slurry to set whereby at least a portion of the water of said slurry evaporates through said first and second facing layers.

In still a further embodiment of this invention, a water-resistant and first-resistant cementitious board useful in building construction is provided. This cementitious board embodiment includes a layer of said cementitious material sandwiched between a pair of facing layers, at least a first of said facing layers comprising glass fibers bonded together with a resinous binder composition having a hydrophilic or adhesive affinity toward said cementitious material when wet, said first facing layer having an air permeability rating of no greater than about 300 CFM/ft$^2$ so as to substantially prevent penetration of a slurry precursor of said cementitious material having a viscosity of less than 5,000 sp at 70° F., but permit water vapor from said slurry to pass therethrough.

In still a further embodiment of this invention, a facing material for gypsum boards is provided which includes a first layer including an oriented fiber-containing layer which is porous to a gypsum slurry; and a second non-woven layer joined to said first layer, said second non-woven layer being less porous to said gypsum slurry than said first layer, and comprising randomly oriented fibers bonded with a resinous binder applied in excess of about 15% by weight of the fibers. This resinous binder does not inhibit adhesion of said facing material to said gypsum, and does not encourage "blocking" between adjacent pairs of said boards during storage.

A BRIEF DESCRIPTION OF THE DRAWINGS

The present invention will be further described with reference to the following drawings.

DEFINED TERMS

Facing materials, cementitious boards and methods of manufacturing cementitious boards having the facing materials of this invention are provided. These facing materials have low areal weights, and substantially prevent the penetration of cementitious slurries, such as those containing Portland cement, mortar and gypsum, yet remain porous enough for water vapor to pass through easily.

In accordance with the present invention, the following definitions are used:

Areal weight. The weight of fiber per unit area (width× length) of tape or fabric.

Cementitious material. An inorganic hydraulically setting material, such as those containing one or more of: Portland cement, mortar, plaster, gypsum, and/or other ingredients, such as, foaming agents, aggregate, glass fibers, moisture repellants and moisture resistant additives and fire retardants.

Composite facing material. Two or more layers of the same or different materials including two or more layers of fabrics, cloth, knits, mats, wovens, non-wovens and/or scrims, for example.

Barrier coat. An exterior coating applied to a composite structure to provide protection.

Fabric. Woven or non-woven flexible materials, such as tissues, cloth, knits, weaves, carded tissue, spun-bonded and point-bonded non-wovens, needled or braided materials.

Fiber. A general term used to refer to filamentary materials. Often, fiber is used synonymously with filament. It is generally accepted that a filament routinely has a finite length that is at least 100 times its diameter. In most cases, it is prepared by drawing from a molten bath, spinning, or by deposition on a substrate.

Filament. The smallest unit of a fibrous material. The basic units formed during drawing and spinning, which are gathered into strands of fiber for use in composites. Filaments usually are of extreme length and very small diameter. Some textile filaments can function as a yarn when they are of sufficient strength and flexibility.

Glass. An inorganic product of fusion that has cooled to a rigid condition without crystallizing. Glass is typically hard and relatively brittle, and has a conchoidal fracture.

Glass cloth. An oriented fabric which can be woven, knit, needled, or braided glass fiber material, for example.

Glass fiber. A fiber spun from an inorganic product of fusion that has cooled to a rigid condition without crystallizing.

Glass Filament. A form of glass that has been drawn to a small diameter and long lengths.

Knitted fabrics. Fabrics produced by interlooping chains of filaments, roving or yarn.

Mat. A fibrous material consisting of randomly oriented chopped filaments, short fibers, or swirled filaments loosely held together with a binder.

Roving. A number of yarns, strands, tows, or ends collected into a parallel bundle with little or no twist.

Tensile strength. The maximum load or force per unit cross-sectional area, within the gage length, of the specimen. The pulling stress required to break a given specimen. (See ASTM D579 and D3039)

Tex. Linear density (or gauge) of a fiber expressed in grams per 1000 meters.

Textile fibers. Fibers or filaments that can be processed into yarn or made into a fabric by interlacing in a variety of methods, including weaving, knitting and braiding.

Viscosity. The property of resistance to flow exhibited within the body of a material, expressed in terms of the relationship between applied shearing stress and resulting rate of strain in shear. Viscosity is usually taken to mean Newtonian viscosity, in which case the ratio of sheathing stress to the rate of shearing strain is constant. In non-Newtonian behavior, the ratio varies with the shearing stress. Such ratios are often called the apparent viscosities at the corresponding shearing stresses. Viscosity is measured in terms of flow in Pa·s (P), with water as the base standard (value of 1.0). The higher the number, the less flow.

Warp. The yarn, fiber or roving running lengthwise in a woven fabric. A group of yarns, fibers or roving in long lengths and approximately parallel.

Weave. The particular manner in which a fabric is formed by interlacing yarns, fibers or roving. Usually assigned a style number.

Weft. The transverse threads or fibers in a woven fabric. Those fibers running perpendicular to the warp. Also called fill, filling, yarn or woof.

Woven fabric. A material (usually a planar structure) constructed by interlacing yarns, fibers, roving or filaments, to form such fabric patterns as plain, harness satin, or leno weaves.

Woven roving. A heavy glass fiber fabric made by weaving roving or yarn bundles.

Yarn. An assemblage of twisted filaments, fibers, or strands, either natural or manufactured, to form a continuous length that is suitable for use in weaving or interweaving into textile materials.

DETAILED DESCRIPTION OF THE INVENTION

With reference to the FIGS., and particularly to FIGS. 1-4 thereof, there is depicted a series of fabrics useful as the facing layer of the preferred facing material of this invention. Needled, woven, knitted and composite materials are preferred because of their impressive strength-to-weight ratio and, in the case of wovens and knits, their ability to form weft and warp yarn patterns which substantially resist the penetration of cementitious slurries. While the facing layers of this invention can contain fibers and filaments of organic and inorganic materials, the most preferred fibers contain glass, olefin (such as polyethylene, polystyrene and polypropylene), Kevlar®, graphite, rayon, polyester, carbon, ceramic fibers, or combinations thereof, such as glass-polyester blends or Twintex® glass-olefin composite, available from Saint-Gobain Technical Fabrics, America, Inc. Of these types of fibers and filaments, glass compositions are the most desirable for their fire resistance, low cost and high mechanical strength properties.

Glass Composition

Although a number of glass compositions have been developed, only a few are used commercially to create continuous glass fibers. The four main glasses used are high alkali (A-glass or AR-glass) useful in motor or cement applications, such as in tile backing, electrical grade (E-glass), a modified E-glass that is chemically resistant (ECR-glass), and high strength (S-glass). The representative chemical compositions of these four glasses are given in Table 1.

TABLE 1

Glass composition

| Glass type | Silica | Alumina | Calcium oxide | Magnesia | Material, wt % Boric oxide | Soda | Calcium fluoride | Total minor oxides |
|---|---|---|---|---|---|---|---|---|
| E-glass | 54 | 14 | 20.5 | 0.5 | 8 | 1 | 1 | 1 |
| A-glass | 72 | 1 | 8 | 4 | — | 14 | — | 1 |
| ECR-glass | 61 | 11 | 22 | 3 | — | 0.6 | — | 2.4 |
| S-glass | 64 | 25 | — | 10 | — | 0.3 | — | 0.7 |

The inherent properties of the four glass fibers having these compositions are given in Table 2.

TABLE 2

Inherent properties of glass fibers

| | Specific gravity | Tensile strength MPa | Tensile strength ksi | Tensile modulus GPa | Tensile modulus $10^6$ psi | Coefficient of thermal expansion, $10^{-6}/K$ | Dielectric constant(a) | Liquidus temperature C.° | Liquidus temperature F.° |
|---|---|---|---|---|---|---|---|---|---|
| E-glass | 2.58 | 3450 | 500 | 72.5 | 10.5 | 5.0 | 6.3 | 1065 | 1950 |
| A-glass | 2.50 | 3040 | 440 | 69.0 | 10.0 | 8.6 | 6.9 | 996 | 1825 |
| ECR-glass | 2.62 | 3625 | 525 | 72.5 | 10.5 | 5.0 | 6.5 | 1204 | 2200 |
| S-glass | 2.48 | 4590 | 665 | 86.0 | 12.5 | 5.6 | 5.1 | 1454 | 2650 |

(a)At 20° C. (72° F.) and 1 MHZ. Source: Ref 4

Glass Melting and Forming

The conversion of molten glass in the forehearth into continuous glass fibers is basically an attenuation process. The molten glass flows through a platinum-rhodium alloy bushing with a large number of holes or tips (400 to 8000, in typical production). The bushing is heated electrically, and the heat is controlled very precisely to maintain a constant glass viscosity. The fibers are drawn down and cooled rapidly as they exit the bushing. A sizing is then applied to the surface of the fibers by passing them over an applicator that continually rotates through the sizing bath to maintain a thin film through which the glass filaments pass. After the sizing is applied, the filaments are gathered into a strand before approaching the take-up device. If smaller bundles of filaments (split strands) are required, multiple gathering devices (often called shoes) are used.

The attenuation rate, and therefore the final filament diameter, is controlled by the take-up device. Fiber diameter is also impacted by bushing temperature, glass viscosity, and the pressure head over the bushing. The most widely used take-up device is the forming winder, which employs a rotating collet and a traverse mechanism to distribute the strand in a random manner as the forming package grows in diameter. This facilitates strand removal from the package in subsequent processing steps, such as roving or chopping. The forming packages are dried and transferred to the specific fabrication area for conversion into the finished fiberglass roving, mat, chopped strand, or other product. In recent years, processes have been developed to produce finished roving or chopped products directly during forming, thus leading to the term direct draw roving or direct chopped strand.

Fabrication Process

Once the continuous glass fibers have been produced they must be converted into a suitable form for their intended application. The major finished forms are continuous roving, woven roving, fiberglass mat, chopped strand, and yarns for textile applications.

Fiberglass roving is produced by collecting a bundle of strands into a single large strand, which is wound into a stable, cylindrical package. This is called a multi-end roving process. The process begins by placing a number of oven-dried forming packages into a creel. The ends are then gathered together under tension and collected on a precision roving winder that has constant traverse-to-winding ratio, called the waywind.

Roving are used in many applications of this invention. Woven roving is produced by weaving fiberglass roving into a fabric form. This yields a coarse product that is used in continuous board manufacturing. The course surface is ideal for stucco and adhesive applications, such as EIF systems, since these material can bind to the coarse fibers easily. Plain or twill weaves are less rough, thereby being easier to handle without protective gloves, but will absorb stucco and adhesive. They also provide strength in both directions, while a unidirectionally stitched or knitted fabric provides strength primarily in one dimension. Many novel fabrics are currently available, including biaxial, double bias, and triaxial weaves for special applications.

Combinations of fiberglass mat, scrim, chopped fibers and woven or knit filaments or roving can also be used for the facing layers of this invention. The appropriate weights of fiberglass mat (usually chopped-strand mat) and woven roving filaments or loose chopped fibers are either bound together with a chemical binder or mechanically knit, needled felted or stitched together. One suitable combination would be a fiberglass and/or resin fiber mat or scrim layered with chopped glass or resin fibers and then needled, felted or stitched together to decrease porosity. These facing materials can have uniform porosity or non-uniform porosity in either the x, y, or z planar directions. For example, as in U.S. Pat. Nos. 3,993,822 and 4,504,533, a porosity gradient can be made within a composite facing to allow partial penetration of the slurry. Alternatively, the coating or saturant, such as a latex resin or wetting or non-wetting agent, can be unevenly applied through the facing thickness to allow partial penetration of the slurry. One example could be to coat the slurry facing side with a low contact angle surface treatment and the outer-facing side with a resinous saturant or high contact angle treatment or hydrophobic agent, for example.

Fiberglass paper can also be used for the facing layers of this invention, so long as it is relatively impervious to slurry and pervious to water vapor. Chopped strands of 25 to 50 mm (1- to 2-in.) lengths are usually used in making fiberglass paper. In this process, chopped fibers are dispersed in a water to form a dilute solution. The fiberglass strands filamentize during the mixing and dispersion process. The solution is pumped onto a continuously moving chain or belt, where most of the water is removed by vacuum, leaving behind a uniformly distributed, thin fiberglass mat. A binding resin is added on-line, followed by drying and curing, to form the fiberglass paper. Although possessing a lower mechanical strength than woven glass fabric, glass paper is cheaper to make and is fire resistant.

The yarns of the facing layers of this invention can be made by conventional means. Fine-fiber strands of yarn from the forming operation can be air dried on forming tubes to provide sufficient integrity to undergo a twisting operation. Twist provides additional integrity to yarn before it is subjected to the weaving process, a typical twist consisting of up to one turn per inch. In many instances heavier yarns are needed for the weaving operation. This is normally accomplished by twisting together two or more single strands, followed by a plying operation. Plying essentially involves retwisting the twisted strands in the opposite direction from the original twist. The two types of twist normally used are known as S and Z, which indicate the direction in which the twisting is done. Usually, two or more strands twisted together with an S twist are plied with a Z twist in order to give a balanced yarn. Thus, the yarn properties, such as strength, bundle diameter, and yield, can be manipulated by the twisting and plying operations. Fiberglass yarns are converted to fabric form by conventional weaving operations. Looms of various kinds are used in the industry, but the air jet loom is the most popular.

Zero twist-yarns may also be used. This input can offer the ease of spreading of (twistless) roving with the coverage of fine-filament yarns. The number of filaments per strand used directly affect the porosity and are related to yarn weight as follows: $n=(490\times Tex)/d^2$, where "d" is the individual filament diameter expressed in microns. Thus, if the roving with coarse filaments can be replaced with near zero twist yarn with filaments half the diameter, then the number of filaments increases by a factor of 4 at the same strand Tex.

The major characteristics of the woven facing embodiments of this invention include its style or weave pattern, fabric count, and the construction of warp yarn and fill yarn. Together, these characteristics determine fabric properties such as drapability and performance in the final board. The fabric count identifies the number of warp and fill yarns per inch. Warp yarns run parallel to the machine direction, and fill yarns are perpendicular.

There are basically four weave patterns: plain, basket, twill, and satin. Plain weave is the simplest form, in which one warp yarn interlaces over and under one fill yarn. Basket weave has two or more warp yarns interlacing over and under two or more fill yarns. Twill weave has one or more warp yarns over at least two fill yarns. Satin weave (crowfoot) consists of one warp yarn interfacing over three and under one fill yarn, to give an irregular pattern in the fabric. The eight harness satin weave is a special case, in which one warp yarn interlaces over seven and under one fill yarn to give an irregular pattern. In fabricating a board, the satin weave gives the best conformity to complex contours, such as around corners, followed in descending order by twill, basket, and plain weaves.

Texturizing is a process in which the textile yarn is subjected to an air jet that impinges on its surface to make the yarn "fluffy". The air jet causes the surface filaments to break at random, giving the yarn a bulkier appearance. The extent to which this occurs can be controlled by the velocity of the air jet and the yarn feed rate. An equivalent effect can be produced by electrostatic or mechanical manipulation of the fibers, yarns or roving.

Fabric Design

The fabric pattern, often called the construction, is an x, y coordinate system. The y-axis represents warp yarns and is the long axis of the fabric roll (typically 30 to 150 m, or 100 to 500 ft.). The x-axis is the fill direction, that is, the roll width (typically 910 to 3050 mm, or 36 to 120 in.). Basic fabrics are few in number, but combinations of different types and sizes of yarns with different warp/fill counts allow for hundreds of variations.

Basic fabric structures include those made by woven, non-woven and knit processes. In this invention, one preferred design is a knit structure in which both the x axis strands and the y axis strands are held together with a third strand or knitting yarn. This type of knitting is weft-inserted-warp knitting. If an unshifted tricot stitch is used, the s and y axis strands are the least compressed and, therefore, give the best coverage at a given areal weight. This structure's coverage can be further increased, i.e., further reduction in porosity, by using near-zero-twist-yarn or roving which, naturally, spreads more than tightly twisted yarn. This design can be further improved by assisting the spreading of filaments by mechanical (needling) means, or by high-speed air dispersion of the filaments before or after fabric formation.

Figure 1:
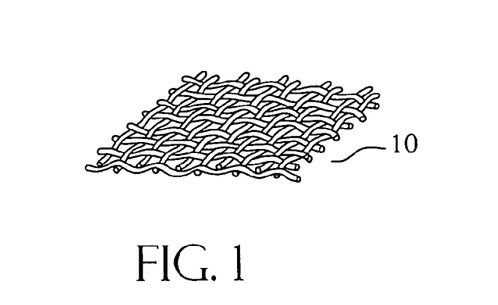
FIG. 1: is a front perspective view of a preferred facing material of this invention employing a plain weave.
Figure 2:
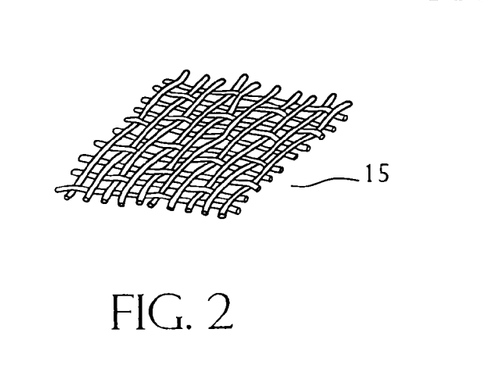
FIG. 2: is an alternative facing material of this invention depicting a five-harness satin weave.

The most common weave construction used for everything from cotton shirts to fiberglass stadium canopies is the plain weave 10, shown in FIG. 1. The essential construction requires only four weaving yarns: two warp and two fill. This basic unit is called the pattern repeat. Plain weave 10, which is the most highly interlaced, is therefore the tightest of the basic fabric designs and most resistant to in-plane shear movement. Basket weave, a variation of plain weave, has warp and fill yarns that are paired: two up and two down. The satin weave 15 represent a family of constructions with a minimum of interlacing. In these, the weft yarns periodically skip, or float, over several warp yarns, as shown in FIG. 2. The satin weave 15 repeat is x yarns long and the float length is x-1 yarns; that is, there is only one interlacing point per pattern repeat per yarn. The floating yarns that are not being woven into the fabric create considerable looseness or suppleness. The satin weave 15 produces a construction with low resistance to shear distortion and is thus easily molded (draped) over common compound curves. Satin weaves can be produced as standard four-, five-, or eight-harness forms. As the number of harnesses increases, so do the float lengths and the degree of looseness making the fabric more difficult to control during handling operations. Textile fabrics generally exhibit greater tensile strength in plain weaves, but greater tear strength in satin weaves. The ultimate mechanical properties are obtained from unidirectional-style fabric 14 (FIG. 3), where the carrier properties essentially vanish when attached to a set core 101. The higher the yarn interlacing (for a given-size yarn), the fewer the number of yarns that can be woven per unit length. The necessary separation between yarns reduces the number that can be packed together. This is the reason for the higher yarn count (yarns/in.) that is possible in unidirectional material and its better physical properties.

A plain weave 16 having glass weft 11 and warp 12 yarns or roving, in a weave construction is known as locking leno (FIG. 4), which is used only in special areas of the fabric, such as the selvage, and is woven on a shuttleless loom. The gripping action of the intertwining leno yarns anchors or locks the open selvage edges produced on rapier looms. The leno weave helps prevent selvage 13 unraveling during subsequent handling operations. However, it has found applications where a very open (but stable) weave is desired.

The design of glass fabrics suitable for this invention begins with only a few fabric parameters: type of fiber, type of yarn, weave style, yarn count, and areal weight.

Fiber finish is also important because it helps lubricate and protect the fiber as it is exposed to the sometimes harsh weaving operation. The quality of the woven fabric is often determined wholly by the type and quality of the fiber finish. The finish of choice, however, is usually dictated by end-use and resin chemistry, and can consist of resinous materials, such as epoxy.

The following fabric styles and categories are useful in the practice of this invention:

| Fabric | Areal wt. grams/m$^2$ | oz/yd$^2$ |
| --- | --- | --- |
| Light weight | 10–35 | 3–10 |
| Intermediate weight | 35–70 | 10–20 |
| Heavy weight | 59–300 | 15–90 |

| Fabric | Thickness μm | mil |
| --- | --- | --- |
| Light weight | 25–125 | 1–5 |
| Intermediate weight | 125–250 | 5–10 |
| Heavy weight | 250–500 | 10–20 |

It has been determined that fabrics having an areal weight of about 15-300 grams/m$^2$, preferably about 30-150 grams/m$^2$, and thicknesses of about 1-22 mils are most preferred. Such fabric should have an air permeability rating of between 10 and 300 CFM/ft$^2$ (FG436-910 test method) and preferably about 10-200 CFM/ft$^2$, and/or can substantially reduce the penetration of slurries, having viscosities of about 300-10,000 CP at 70° F., preferably less than 5,000 CP, and most preferably about 1,000-4,000 CP. The preferred facing material should also possess an ASTM D309 tensile strength of at least about 20 psi in the machine direction and about 5 psi in the cross-machine direction.

Figure 3:
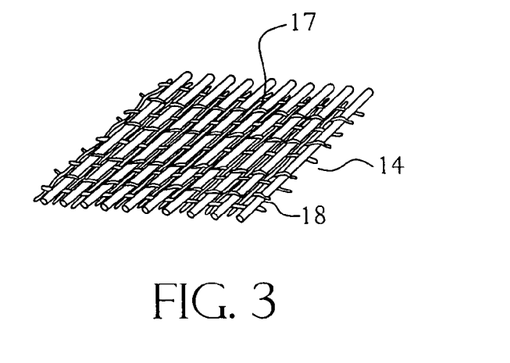
FIG. 3: is a further embodiment of the facing material of this invention depicting a uni-directional weave.
Figure 4:
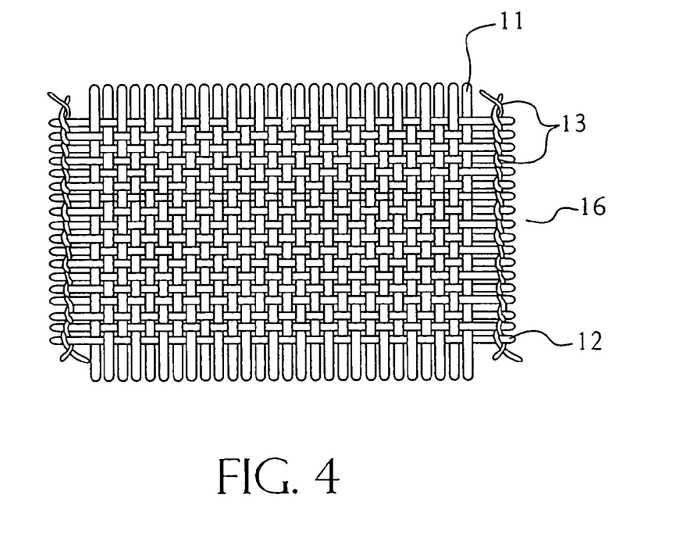
FIG. 4: is a further embodiment of the facing material of this invention depicting a full-width plain weave with selvage.

Combining fibers with very different properties can provide a fabric with good longitudinal strength/stiffness values, as well as transverse (fill direction) toughness and impact resistance. The ability to hybridize the fabric allows the board designer the freedom to build cementitious boards with different and perhaps conflicting requirements without major compromises. It is also possible to "teach" the looms new tricks, particularly in three-directional weaving, but interesting modifications are even possible for two-directional fabric. The loom has the capability of weaving an endless helix using different warp and fiber fill. Alternatively, a glass textile roving warp 17 and olefin weft 18, such as polyethylene or polystyrene fiber, can be used, as shown in FIG. 3. Alternatively, blends such as Twintex® glass-polyolefin blends produced by Saint-Gobain Technical Fabrics America, Inc., or individual multiple layers of polymers, elastomerics, rayon, polyester and glass filaments can be used as roving or yarn for the facing material, or as additional bonded or sewn layers of woven, knitted felt or non-woven layers.

Figure 9:
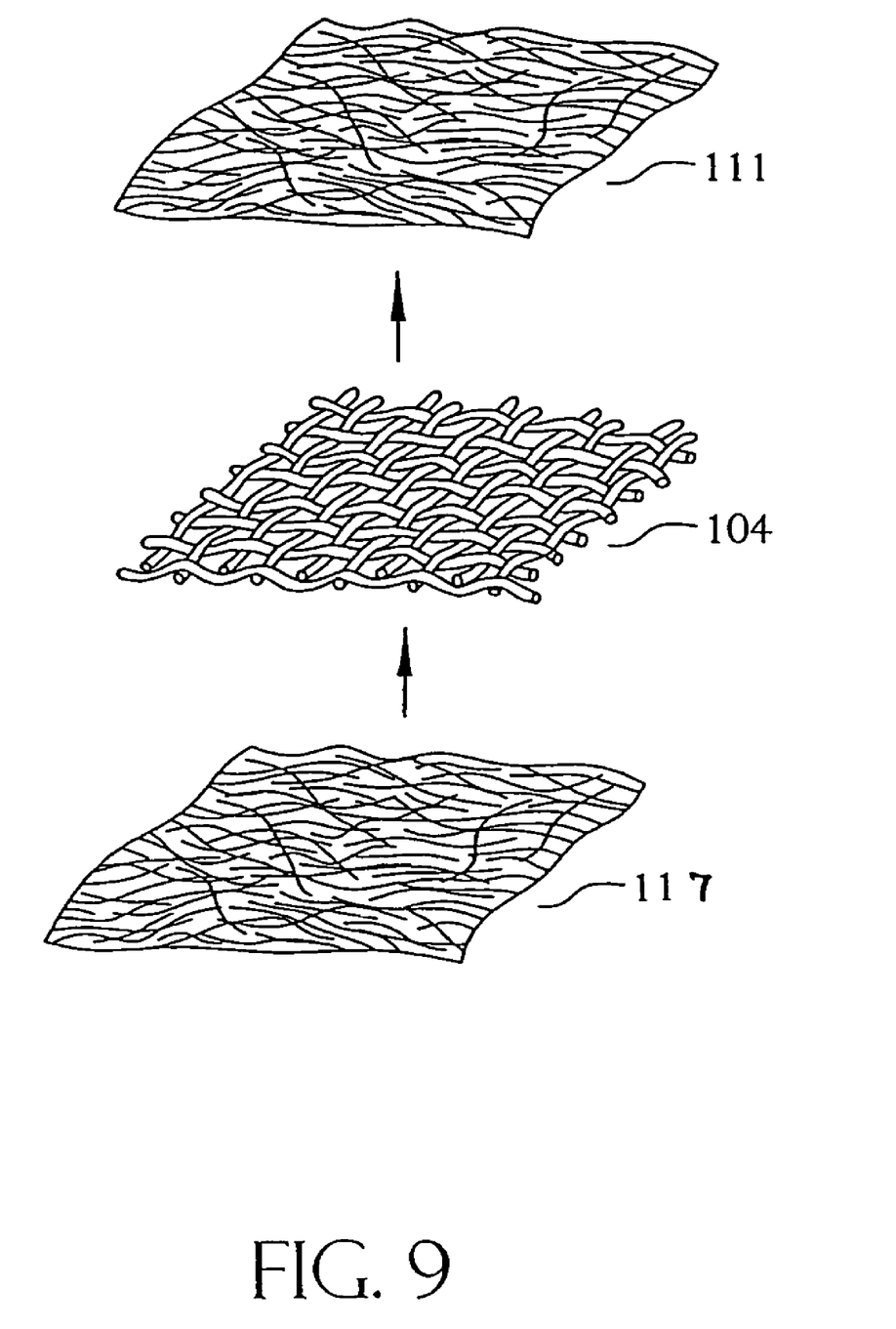
FIG. 9: is a front perspective, exploded view of a preferred composite facing material of this invention.

For example, a light weight thermoplastic, thermoset and/or glass fiber layer 111, such as a woven fabric, knit fabric, non-woven tissue, paper, needled layer or mat, could be laminated, adhered, needled, sewn knitted, woven, melt bonded, or joined using a combination of these techniques, with a stronger, more porous layer, such as a polymeric or glass inner layer 104, or loose knitted or woven substrate, as shown in FIG. 9, to provide both slurry penetration resistance and core reinforcement. (See Altenhofer et al., U.S. Pat. No. 4,504,533, or Knauf et al., U.S. Pat. No. 3,993,822, which are both hereby incorporated by reference.) The inner layer can be a woven open mesh, or non-woven generally transverse and longitudinal fibers joined at cross-over points with or without adhesive binder or sizing, and containing fibers, rovings or yarn, for example. As such, the denser, light weight layer 111 provides only limited or negligible penetration of gypsum or cement slurry, while the inner layer 104 can be embedded in the core to provide good mechanical adherence to the core, and greater overall strength to the board. Additionally, since the inner layer can reinforce the light weight denser layer prior to adherence to the core, the light weight, denser layer 111 can be inexpensive and need not possess the tensile strength required to withstand the rigors of a continuous cementitious board manufacturing line by itself As such, the inner layer 104 acts to reinforce the light weight, denser layer 111 to resist distortion of said layer and, naturally, the overall facer layer itself, during continuous board manufacturing. Optionally, an additional light weight layer 117 can be applied to the set core facing side of the inner layer 104. Light weight layers 111 and 117 need not be the same density, nor contain the same fibrous material, and each may or may not be impregnated or coated.

With further reference to a preferred construction employing a light weight layer 117 and woven layer or scrim 104 as the face or faces of a cementitious board 100 of this invention, preferred designs employ a light weight layer 117 employing a random oriented glass mat bound together with a resinous binder, such as glass fibers in sizes: K-fiber (13 microns); H-fiber (10 microns); or M-fiber (16 microns), or less. It is known, generally, that random oriented mats manufactured with H-fibers are nearly twice as dense as random oriented mats manufactured with M-fibers at the same areal weight, preferably about 1-3 lbs/per 100 ft$^2$, more preferable about 1.8 lbs/100 ft$^2$. The scrim 104 can be lighter or heavier in weight than the light weight layer 117, and is preferably joined to the light weight layer 117 by adhesive, such as by the core or a resin binder, or mechanically joined, such as by sewing, needling, etc.

Random oriented glass mats are generally made by a wet process in which individual or continuous fibers are disposed in a slurry and collected on a screen or porous belt for de-watering. The de-watered fibers are then subjected to a cascade waterfall of binder (also called a "sizing"), which is applied to the fibers and suctioned through it. Alternatively, the glass fibers can be wet processed or further supplemented with thermoplastic fibers which can be melted into the random oriented glass fibers to provide a resin binder.

A typical binder/glass wool loading is about 3-15 wt %, but this invention anticipates using in excess of 15 wt. % binder, and preferably greater than 20 wt. %, and most preferably about 25-30 wt % binder in the facing layer or layers, such as the above-described random oriented glass mat, for providing desirable properties, such as slurry penetration resistance, adherence to the core or other layers or materials, hydrophobic or hydrophilic properties, or a combination of these properties. Such binders are not a barrier coating and will enable water vapor to pass through the facing during board manufacturing. These binders also preferably do not completely coat the exterior facing fibers, so as to enable attachment to factory or field applied coatings or adhesives such as Portland cement based mortar, acrylic adhesive, silicon adhesive and glue on the outer surface of the cementitious board. The selected binders should also minimize "blocking" (adhesive bonding between adjacent boards during storage). Various binders are appropriate for this purpose, such as, for example, phenolic binders, ureaformaldehyde resin, or ureaformaldehyde resin modified with acrylic, styrene acrylic, with or without carboxylated polymers as part of the molecule, or as a separate additive. Additionally, these binders can be provided with additives, such as UV and mold inhibitors, fire retardants, etc. Carboxylated polymer additions to the binder resin can promote greater affinity to set gypsum, or to Portland cement-based mortars, for example, but are less subjected to blocking than resins without such additions. One particularly desirable binder resin composition is a 70 wt % ureaformaldehyde resin-30 wt % styrene acrylic latex or an acrylic latex mixture, with a carboxylated polymer addition.

The preferred composite facing should also include a scrim 104 or a woven or knit structure that is porous to gypsum or cement slurries. Ideally, the scrim 104 contains a 6×6 ends/inch simple weave or bonded lattice structure, although sizes from about 4×4 through about 10×10 ends/inch will be acceptable. The preferred fiber size for the scrim 104 is about 68 tex (G75; EC968) which is both economical and broadly available. The scrim 104, or equivalent layer, can also contain a sizing, which is chemically the same or different from those described above. It is understood that the sizings applied to light weight layer 117 and scrim 104 could be custom designed for end use applications. For example, the scrim 104 could be treated with a carboxylated styrene acrylic or acrylic blend having greater affinity to a gypsum core, while the binder resin of the light weight layer 117 might be treated with a hydrophobic additive, to resist slurry penetration. Other additives and resin compositions suggested herein as being useful in the cementitious core 101 and coating or saturant 107, could also be employed in the binder.

The substrates or layers of this invention useful in construction of the porous facing layers can be further treated or saturated prior to adhering these layers to a core material in order to further reduce porosity, to resist slurry penetration, and to reduce the "fuzziness" of the surface, which can lead to some itching during repeated handling. Resinous coatings and saturants 107 are distinguished from the sizing or binder used to bond the fibers together to form the individual layers, as described above. Coatings and saturants 107 can include those described in U.S. Pat. No. 4,640,864, which is hereby incorporated by reference, and are preferably water-resistant and/or fire-retardant in nature. They can be applied during the manufacture of the porous facing layers of this invention, or by the board manufacturer prior to use in making boards. This is distinguished from coatings applied to the facings of finished boards following the setting of the gypsum core for imparting water resistance to the finished board. See U.S. Pat. No. 5,552,187, for example.

Figure 6:
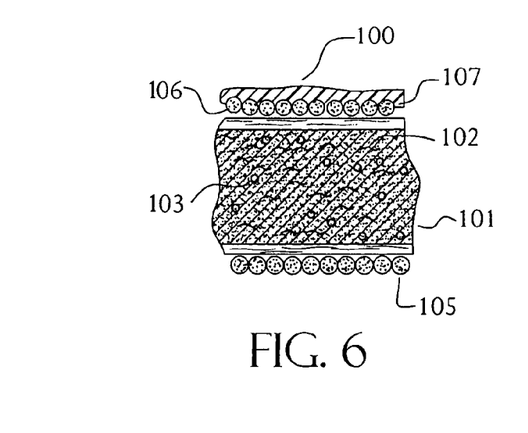
FIG. 6: is a magnified view of a coated cementitious board of FIG. 5.
Figure 7:
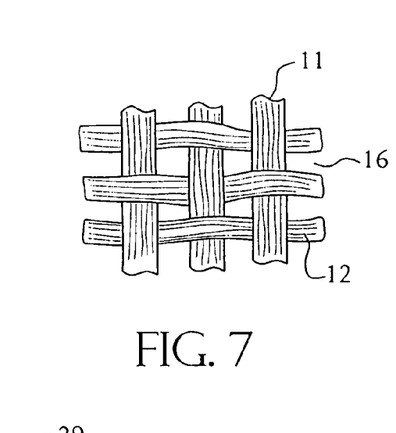
FIG. 7: is a loose full-width plain weave glass fabric prior to manipulation.
Figure 8:
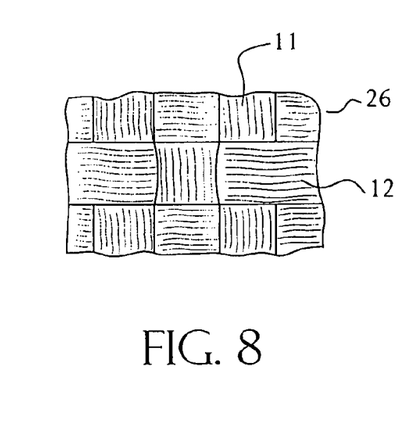
FIG. 8: is the full-width plain weave glass fabric of FIG. 7, after the glass fiber filaments have been electrostatically or mechanically manipulated.

The saturant or coating 107 applied to the porous facing layers, as shown in FIG. 6, of this invention preferably coats a portion of the fibers and reduces the porosity of the facing layer. Alternatively, the saturant or coating 107 can increase or decrease the wetting angle of the gypsum slurry to reduce penetration or increase adhesion. The saturant or coating 107 can further contain a UV stabilizer, mold retardant, water repellant, a flame retardant and/or other optional ingredients, such as dispersants, catalysts, fillers and the like. Preferably, the saturant or coating 107 is in liquid form and the facing material is led through the liquid, or the liquid is sprayed (with or without a water spray precursor) on one or both sides of the facing material. For example, a resin which is adherent to gypsum can be applied to only the core facing side of light weight layer 117 and entirely around the scrim 104 to promote adhesion to the core. Thereafter, the facing material may be squeezed and dried.

Various methods of applying the liquid may be used, including dip-coaters, doctor blade devices, roll coaters and the like. One preferred method of treating the facing material with the resinous coatings or saturants 107 of this invention is to have a lower portion of one roll partially submerged in a trough of the liquid resinous composition and the facer material pressed against the upper portion of the same roller so that an amount of the resinous composition is transferred to the facer material. The second roller above the first roller controls the movement of the facer material and the uniformity of the amount of resinous coating or saturant 107 disposed thereon. Thereafter, the coated facer material is led in a preferred method to steam cans to expedite drying. It is preferred to pass the coated facer material over steam cans at about 250-450° F. (100-200° C.) which drives the water off, if a latex is used, and additionally may cause some flow of the liquid resinous material to further fill intersticies and reduce porosity in the facer material, as well as coat further and more uniformly fibers within the facer material. The coating preferably covers about 50-80% of the surface area targeted, more preferably about 80-95% of said area; 100% coverage is less desirable due to blow offs and blistering due to steam generated during the setting of gypsum products. Desirably, the saturated facing can be somewhat impermeable to liquid water, but is porous to water vapor, whether wet or dry, and is not considered a water vapor retarder or barrier.

The preferred saturant or coatings 107 of this invention can contain a resinous mixture containing one or more resins. The resin can contain solid particles or fibers which coalesce or melt to form a continuous or semi-continuous coating which substantially prevents the penetration of liquid moisture, but permits water vapor to pass through the cross section of the facing layer. The coating can be applied in various thicknesses, such as for example, to sufficiently cover the fibrous constituents of the facing layer so that no fibers protrude from the coating or saturant, or to such a degree that the fibers protrude from the coating or saturant so that they can be used to join to additional layers in a EIF system or to tile, for example. The resinous coating or saturant forms a liquid water barrier which protects the rolls and other equipment during the manufacture of a cementitious board, and which can later, optionally, protect the underlying set gypsum from moisture during storage or use.

The resinous coating or saturant 107 can comprise a thermoplastic or a thermoset resin. Numerous commercially available resins which are effective in forming water- or weather-resistant coatings are available. The preferred coating or saturant 107 of this invention is optionally capable of forming a coating having a surface water absorption value of no greater than about 0.05 grams, as measured by a "Modified Cobb Test", in which a 5 inch$^2$ coated sample is contacted with a 4.5 inch diameter×1 inch high Cobb ring filled with water for 2 hours. In this embodiment, boards should also absorb less than 10 wt. %, preferably less than 5 wt. % water when tested in accordance with the immersion test of ASTM method C-473, when a water resistant core formulation is used.

The coating or saturant 107 of this invention can be formed substantially by the water-resistant resin, but good results can also be achieved by forming the coating or saturant from a mixture of resin and fillers, such as silicates, silica, gypsum, titanium dioxide and calcium carbonate. The saturant or coating 107 can be applied in latex or curable thermosetting form. Acceptable resins include styrene-acrylic copolymer, acrylics, flame retardant acrylics or brominated monomer additions to acrylic, such as Pyropoly AC2001, poly(vinyl acetates), poly(vinyl alcohols), vinylidene chloride, siloxane, and polyvinylchloride such as Vycar® 578. In addition, fire retardants, such as bromated phosphorous complex, halogenated paraffin, colloidal antimony pentoxide, borax, unexpanded vermiculite, clay, colloidal silica and colloidal aluminum can be added to the resinous coating or saturant. Furthermore, water resistant additives can be added, such as paraffin, and combinations of paraffin and ammonium salt, fluorochemicals designed to impart alcohol and water repellency, such as FC-824 from 3M Co., organohydrogenpolysiloxanes, silicone oil, wax-asphalt emulsions and poly(vinyl alcohol) with or without a minor amount a minor amount of poly(vinyl acetate). Finally, the saturant and coatings can include pigment, such as kaolin clay, or lamp black thickeners such as modified bentonite clay, defoamers, such as fatty acid/polyglycol mixtures, UV resistance additives, setting accelerators, such as clay compounds, polyacrylamide, potassium salts, or combinations thereof, and dispersants such as sodium polyacrylate. Known preservatives and, of course, water can be added in latex compositions, and solvents in thermosetting compositions. (See, for example, U.S. Pat. No. 4,640,864, which includes insulation boards including polyvinylchloride based coatings including fire- and water-repellants, and which is hereby incorporated by reference). Other additives, suggested herein as being useful in the binder or cementitious core 101, could also be employed in the coating or saturant 107.

In this context, some preferred laminate constructions, such as those disclosed earlier in connection with the discussion of FIG. 9, can include coatings or saturants which assist in either joining the laminate to the set core 101, or assist it to reduce porosity to resist slurry penetration, and/or helping it to reduce irritation to workers. One laminate that evidences promise includes a laminate made from a polyvinyl alcohol coated fiberglass scrim 104, which is laminated using a polyvinyl alcohol binder to a fiberglass mat or tissue 111. The mat or tissue layer may or may not be saturated with the polyvinyl alcohol resin. In a second practical example of this invention, a laminate is fabricated from a polyvinyl alcohol coated fiberglass scrim 104, which is laminated using a fire resistant and ultraviolet resistant acrylic binder to a fiberglass mat or tissue. The mat or tissue may or may not be saturated with an acrylic binder.

Board Manufacturing

Figure 5:
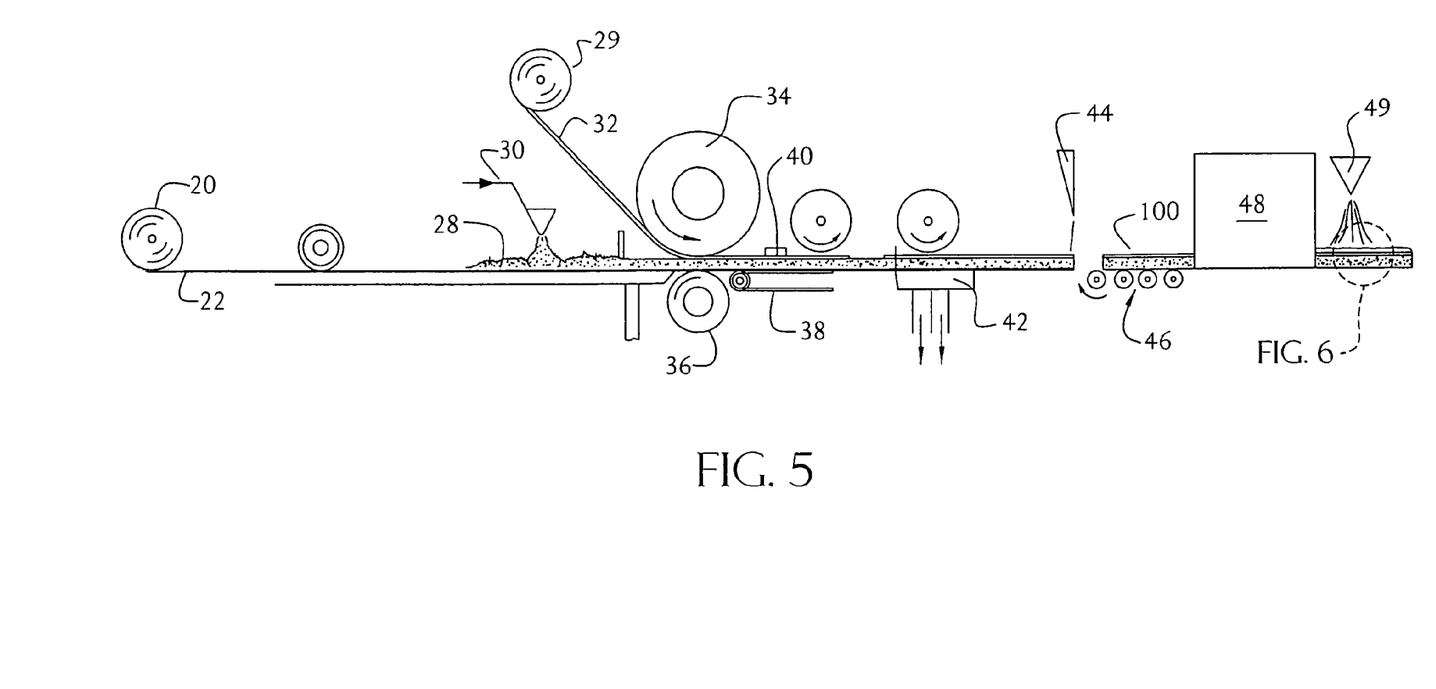
FIG. 5: is a diagrammatic, side elevational view of a proposed continuous manufacturing line for producing cementitious boards using the facing material of this invention.

With reference to FIG. 5, a preferred method of continuously manufacturing cementitious boards is described.

While it is preferred that slightly-modified, conventional wallboard manufacturing equipment be employed for producing the cementitious boards 100 of this invention, cementitious boards 100 can be manufactured in any number of ways, including molding, extrusion, and semi-continuous processes employing rollers and segments of the glass fabrics of this invention.

With reference to FIG. 6, which is a blown up segment of the coated board shown in FIG. 5, the detail of a preferred a cementitious board 100 is provided. The cementitious board 100 includes a set core 101, made of set gypsum or Portland cement, for example. The set core 101 can also optimally contain fillers, reinforcing fiber 102 and performance additives 103. Reinforcing fibers 102 desirably include chopped fibers of no greater than about two inches in length used to reinforce the set core 101. Such fibers can include, for example, Kevlar®, glass, polyolefin, and cellulosic fibers, such as straw or paper fiber. Performance additives can include water resistant additives such as silicone, and fire resistant additives such as borax, as well as the other water-and fire-resistant additives discussed above in connection with the resinous saturant or coating of the facing layer. The composition from which the set core is made can further include optional constituents, including, for example, those included in gypsum and cement exterior sheathing. Examples of such constituents include set accelerators, foaming agents, and dispersing agents.

Examples of materials which have been reported as being effective for improving the water-resistant properties of cementitious products either as a coating 107 or performance additive 103 are the following: poly(vinyl alcohol), with or without a minor amount of poly(vinyl acetate); metallic resinates; wax or asphalt or mixtures thereof; a mixture of wax and/or asphalt and also corn-flower and potassium permanganate; water insoluble thermoplastic organic materials such as petroleum and natural asphalt, coal tar, and thermoplastic synthetic resins such as poly(vinyl acetate), polyvinylchloride and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin, aromatic isocyanates and disocyanates; organohydrogenpolysiloxanes and other silicones, acrylics, and a wax-asphalt emulsion with or without such materials as potassium sulfate, alkali and alkaline earth eliminates. Performance additives 103 can be introduced directly into the cementitious slurry 28. The moisture retarding coatings 107 can be applied to the facing material before or after joining to the set core 101.

If gypsum is employed, the core may be formed by mixing water with powdered anhydrous calcium sulfate or calcium sulfate hemidrate (Ca—SO$_4$ ½H$_2$O), also known as calcined gypsum, and thereafter allowing the mixture to hydrate or set into calcium sulfate dihydrate (CaSO$_4$ 2H$_2$O), a relatively hard material. The set core 101 of the support member will in general comprise at least about 85 wt. % set gypsum or cement.

The surface of the set core 101 is faced with one or more layers of the facing material. The facing material should be sufficiently porous to permit water in the aqueous slurry from which the core is made to evaporate therethrough. As described in the detail below, the cementitious board 100 in the present invention can be made efficiently by forming an aqueous slurry which contains excess water and placing thereon the facing material. Aided by heating, excess water evaporates through the preferred upper and lower glass fabric facings 105 and 106 as the cementitious slurry 28 sets.

Continuous Manufacturing Method

An attractive feature of the present invention is that the cementitious board 100 can be made utilizing existing wallboard manufacturing lines, for example, as shown somewhat diagrammatically in FIG. 5. In conventional fashion, dry ingredients (not shown) from which the set core 101 is formed are pre-mixed and then fed to a mixer of the type commonly referred to as a pin mixer 30. Water and other liquid constituents (not shown) used in making the core are metered into the pin mixer 30 where they are combined with the dry ingredients to form an aqueous cementitious slurry 28. Foam is generally added to the slurry in the pin mixer 30 to control the density of the resulting set core 101.

In general, the facing material of this invention permits the use of lower viscosity slurries to be employed than would be expected when making gypsum or cement products with glass mats. Typically, as stated in U.S. Pat. No. 5,319,900 (herein incorporated by reference), at col. 12, line 45-col. 13, line 2, viscosity control agents, such as cellulosic thickeners, bentonite clays, starches and gypsum whisker fibers, are employed to provide a gypsum slurry of about 5,000-7,000 (Brookfield test at 70° F. at 10 rpm using a No. 3 paddle). The present invention, due to the slurry penetration resistance of the preferred facing material, can employ slurry viscosities of substantially less than 5000 cp, and preferably about 1,000-4,000 at 70° F., depending upon the product selected and whether the top or the bottom or both facing material is selected to be gypsum or cement free, and/or resistant to slurry and liquid water penetration. The cementitious slurry 28 thus formed, is dispersed through one or more outlets at the bottom of the pin mixer 30 onto a moving bottom glass fabric 22 which optionally may contain one or more layers of the facing material of this invention. The bottom glass fabric 22, which may also contain, and preferably contains, one or more layers of the inventive facing material, is indefinite in length and is fed from the bottom glass fabric roll 20.

As is common practice in the manufacture of conventional paper-faced gypsum board, the two opposite edge portions of the bottom glass fabric 22 are progressively flexed upwardly from the mean plane of the fabric 22 and then turned inwardly at the margins so as to provide coverings for the edges of the resulting board 100.

A sheet of top glass fabric 32 is fed from the top glass fabric roll 29 onto the top of the cementitious slurry 28, thereby sandwiching the slurry between the two moving fibrous mats which form the facings of the set core 101 which is formed from the cementitious slurry 28. The bottom and top glass fabrics 22 and 32, with the cementitious slurry 28 sandwiched therebetween enter the nip between the upper and lower forming or shaping rolls 34 and 36 and are thereafter received on a conveyer belt 38. Conventional wallboard edge guiding devices 40 shape and maintain the edges of the composite until the slurry has set sufficiently to retain its shape. Water of convenience, or excess water, can be drained with the assistance of vacuum boxes 42 disposed below the conveyor belt 38. In due course, sequential lengths of the board are cut by a water knife 44. The cementitious board 100 is next moved along feeder rolls 46 to permit it to set. It is further processed by exposure to heat in a drying oven 48 which accelerates the drying of the board by increasing the rate of evaporation of excess water. An additional sprayer 49 can be provided to add further treatments, such as silicone oil or fire retardants, to the board's exterior.

The facing materials and cementitious boards 100 of this invention are useful in all sorts of building construction applications. They are strong, having a screw strength of at least about 20 lbs., for gypsum cores of conventional densities and compositions. Some examples include shaft wall assemblies for elevators and stairways, fire doors and fire walls, roofing and siding substrates, with or without insulation, and tile backer boards. One of the most desirable and useful applications for this invention are in EIF systems (also called EIF systems for Exterior Insulation Finishing Systems).

The essential components of an EIF system include some form of insulating material which is sandwiched between an underlying support surface and an exterior finishing material which can be an integral part of the insulating material, but is usually applied to the insulating material at the site of installation. Cementitious boards including the facing material of this invention are particularly useful for the support surface. From one EIF system to the next, there exists various structural details and components. For example, although the exterior finishing material may be affixed directly to the insulating material, various systems include a reinforcing component sandwiched between the exterior finishing material and the insulating material. The reinforcing component comprises generally one or more plies of fiberglass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. In new construction, the support surface is typically affixed directly to the frame of the building. The adhesive or mastic for adhering together components of the system tends to vary from one system to the next, and typically comprises specially formulated proprietary compositions.

Presently, the most popularly used insulating material in EIF systems is expanded or foamed polystyrene, a material which has good moisture resistant properties. Although is has desirably low water vapor transmission, it is not a vapor barrier, but instead is capable of breathing. Rigid panels of expanded polystyrene are used most widely in EIF systems. Such panels have satisfactory compressive strength and resilience and are presently available in thicknesses ranging from ½ to 6 inches, widths from 6 to 48 inches and lengths ranging from 4 feet to 16 feet. One commercially available system utilizes rigid, expanded polystyrene panels which are 2'×4'×1".

Other thermal insulating materials can be used in EIF systems also. Examples of such materials include extruded polystyrene, polyurethane, isocyanurate, cement-based insulating plasters, and phenolic foam. Insulating materials generally have low thermal conducting and low density.

As mentioned above, various EIF systems include a reinforcing component, for example, in cloth form, sandwiched between the insulating material and the exterior finishing material. Glass cloth is most widely used at the present time to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fiber scrim and glass fiber mesh. Installation of the reinforcing fabric generally involves applying a suitable adhesive to the surface of the insulating material and then applying the fabric thereto. Additional plies of fabric can be applied if desirable. A cement/acrylic resin is an example of an adhesive that can be used.

The exterior finishing material can be affixed directly to the insulating material or to an intermediate surface such as, for example, the surface of a reinforcing member as described above. The exterior finishing material should have weathering characteristics and is preferably appealing in appearance. Presently, the most widely used exterior finish is an acrylic resin-based composition which is available in a paste-type form which is spread or troweled on the underlying substrate. One type of such composition can be described as a ready-mixed synthetic resin plaster. After application, the resin sets to form a tough, weather-resistant solid material which adheres tightly to the underlying substrate. Such resin compositions are available commercially in a variety of colors. They include optional aggregate which can vary in size. This allows the applicator to choose a particular composition which permits him to apply a finish that can vary in texture from fine to coarse. Finishes which have a stucco-like appearance are popular. Small stones of various colors can be embedded in the composition for decorative purposes. Examples of other materials that can be used as an exterior finish are Portland cement stucco including, for example, sand and larger aggregate. The exterior finish can vary in thickness over a wide range, with a thickness of about 1/16" to about 1/4" being exemplary.

From the foregoing, it can be realized that this invention provides facing materials for cementitious boards which are lightweight, exhibit high strength in combination with set cementitious core materials, and which remain porous to water vapor. The preferred glass fabric facings of this invention bond to set gypsum and Portland cement to form a strong integral structure, yet can present a textured surface for joining to other layers of EIF systems, such as, for example, adhesive bonding to polystyrene insulation. The woven, knitted or needled exterior surface of the preferred textile fiber fabrics is also easier to handle by construction workers, and will not lead to as much injury or irritation as chopped fiber glass mats having exposed sharp individual fibers. The choice of needling, weaving and knitting operations of this invention lend themselves to numerous engineering and design choices which can combine wefts and warps of different filament orientation and filament composition, for creating unique facing properties. One of the desirable properties of the current invention is its ability to resist the penetration of cementitious slurries, thus avoiding roll contamination in continuous wall board making machinery. Although various embodiments have been illustrated, this is for the purpose of describing, but not limiting, the invention. Various modifications, which will become apparent to one skilled in the art, are within the scope of this invention described in the attached claims.

What is claimed is:

1. A cementitious board for building construction, comprising:
   a cementitious material layer between two facing layers;
   the cementitious material layer being formed by solidification of a slurry comprising, cementitious material and water;
   at least one of the two facing layers comprising, an inner layer having reinforcing fibers, and a porous facing layer having a slurry facing side and an exterior side;
   a water repellant material on at least the exterior side of the porous facing layer providing the exterior side with water repellency to repel rain and water from the cementitious board, said water repellant material repelling said slurry from penetration through the exterior side of the facing material to prevent slurry contamination on the exterior side of the facing material;
   the cementitious material layer penetrating the inner layer and the reinforcing fibers;
   the cementitious material layer being in contact with the slurry facing side of the porous facing layer;
   a slurry wetting agent on the slurry facing side of the porous facing layer for wetting by the slurry; and
   pores of the porous facing layer being permeable to evaporated water from the slurry.

2. The cementitious board as in claim 1, further comprising:
   a porosity reducing coating or saturant on the exterior side of the porous facing layer, which reduces porosity of the exterior side to resist slurry penetration, while the pores of the porous facing layer are permeable to the evaporated water from the slurry.

3. The cementitious board as in claim 1, further comprising:
   said water repellant material comprising hydrophobic material over at least the exterior side of the porous facing layer.

4. The cementitious board as in claim 3, further comprising:
   a porosity reducing coating or saturant on the exterior side of the porous facing layer, which reduces porosity of the exterior side to resist slurry penetration while the pores of the porous facing layer are permeable to the evaporated water from the slurry.

5. The cementitious board of claim 1, wherein said one of the two facing layers comprises a scrim, knit, needled or woven fabric or cloth, a random oriented, non-woven mat, or combination thereof.

6. The cementitious board of claim 1 wherein said slurry wetting agent comprises a resinous saturant or coating for wetting by the slurry to fill voids in the porous facing layer, to increase adherence to the cementitious material, alters to alter the wetting angle of the slurry, or a combination thereof.

7. The cementitious board of claim 1, wherein said one of the two facing layers comprises, a dense, light weight non-woven or needled layer having glass fibers, the glass fibers having an average diameter of less than 16 microns, bonded to a glass scrim.

8. The cementitious board of claim 1, wherein said one of the two facing layers comprises, glass fibers bonded together with a resinous binder composition having a hydrophilic affinity or adhesive affinity for said cementitious material when wetted by said slurry.

9. The cementitious board of claim 1, wherein said one of the two facing layers comprises, a permeability having an air permeability rating of no greater than about 300 $CFM/ft^2$, substantially preventing penetration of said slurry having a viscosity of less than 5,000 cp at 70° F., and permitting passage therethrough of water vapor emitted from said slurry.

10. The cementitious board of claim 1, wherein the porous facing layer further comprises;
    glass fibers having an average diameter of less than about 16 microns, and having an air permeability rating of less than about 300 $CFM/ft^2$ (FG436-910 test method)

to substantially prevent penetration of said slurry, and permit passage therethrough of water vapor emitted from said slurry.

11. The cementitious board of claim 1, wherein the porous facing layer further comprises; a random oriented glass fiber-containing mat having an areal weight of about 30-150 grams/m$^2$.

12. The cementitious board of claim 1, wherein the porous facing layer resists penetration of said slurry without a substantial viscosity control additive in said slurry.

13. The cementitious board of claim 1, wherein the porous facing layer further comprises; a scrim and a non-woven mat.

14. The cementitious board of claim 13, wherein said scrim and said non-woven mat are hydrophilic, and are bound by a non-hydrophobic resinous binder.

15. The cementitious board of claim 13, wherein, either said non-woven mat, or said scrim, or both, further comprise; a fire retardant, a water repellant, or both, in the form of a resinous saturant or coating.

16. The cemtentitious board of claim 5, wherein said one of the two facing layers comprises a non-woven mat and wherein said non-woven mat further comprises; a fire retardant, water repellent, or both, in the form of a resinous saturant or coating.

17. The cementitious board of claim 1, wherein the porous facing layer comprises, filaments located in both a machine and cross-machine direction.

18. The cementitious board of claim 1, wherein said cementitious material comprises gypsum for a gypsum wall board.

* * * * *